Aug. 30, 1955  V. A. FURST  2,716,438
RECIPROCABLE AUTO SEAT
Filed March 26, 1952  2 Sheets-Sheet 1
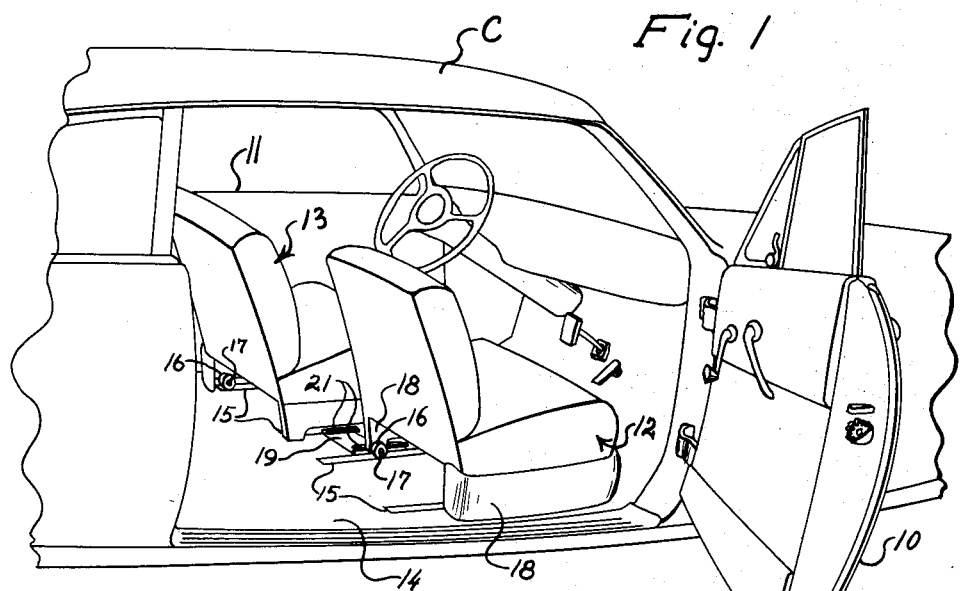
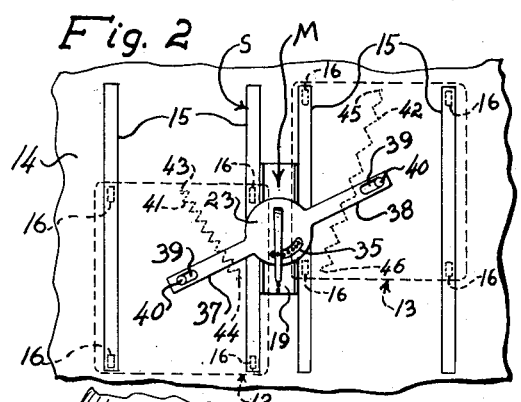
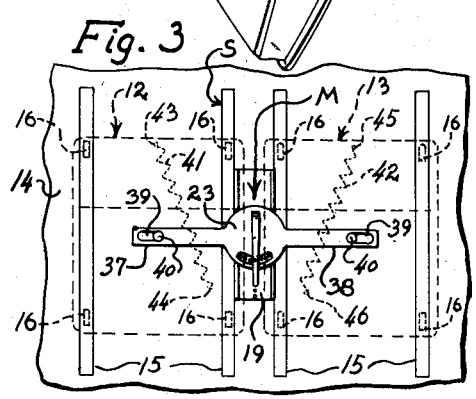
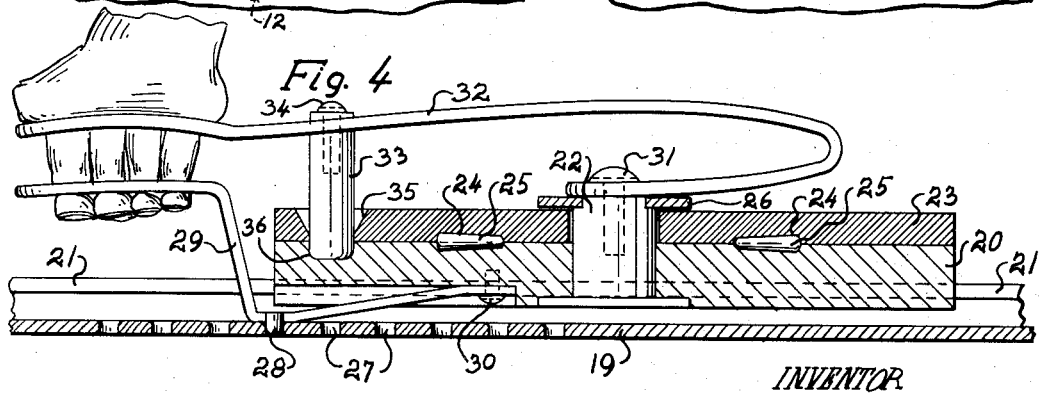
INVENTOR
VALLE A. FURST
BY Williamson, Williamson, Schroeder & Adams
ATTORNEYS Aug. 30, 1955 V. A. FURST 2,716,438
RECIPROCABLE AUTO SEAT
Filed March 26, 1952 2 Sheets-Sheet 2
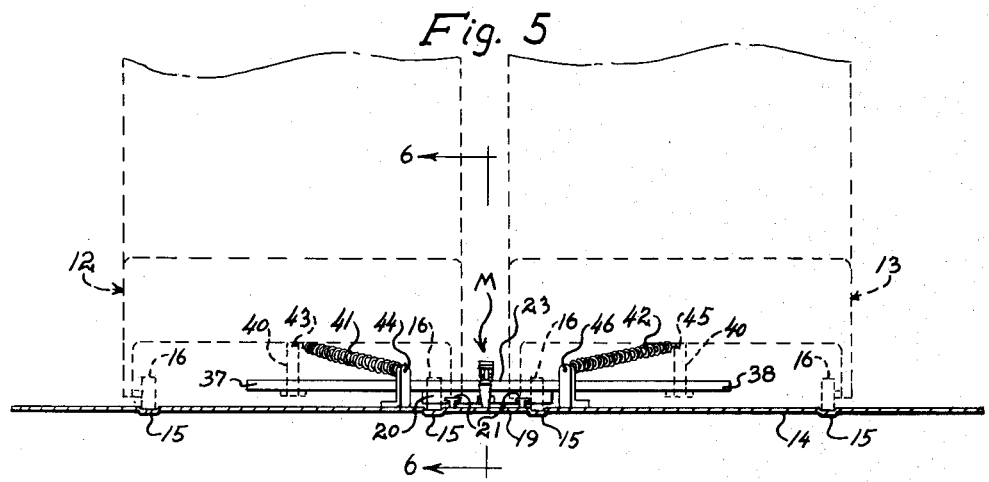
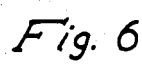
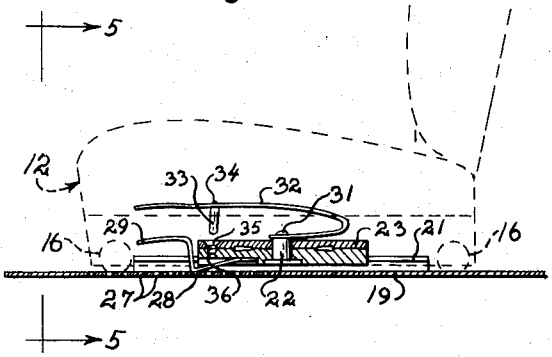
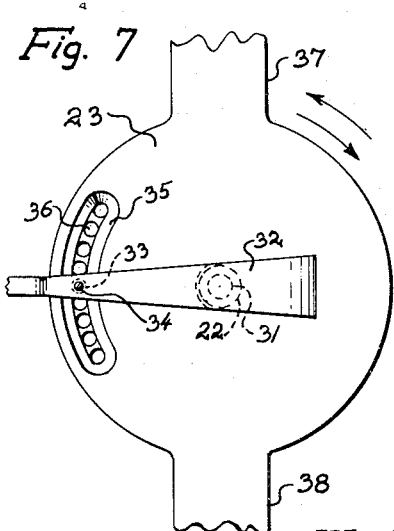
INVENTOR
VALLE A. FURST
BY *Williamson, Williamson, Schroeder & Adams*
ATTORNEYS _United States Patent Office_

2,716,438
Patented Aug. 30, 1955

2,716,438

RECIPROCABLE AUTO SEAT

Valle A. Furst, St. Paul, Minn., assignor of one-half to M. David McCloud, St. Paul, Minn.

Application March 26, 1952, Serial No. 278,541

5 Claims. (Cl. 155—15)

This invention relates to an automobile seat assembly and more particularly to individual adjacent automobile seats which are adjustably shiftable relative to the automobile floor for the purpose of increasing the comfort of persons riding in the automobile and to permit easy entrance into an automobile of the coach or two-door type.

Heretofore, various types of seats and seating arrangements have been proposed for the purpose of facilitating entrance through a single door of a two-door type of auto body. Some of these propose merely to furnish a folding back which is split in the center but not at the horizontal surface. In such case with the seat back folded forwardly the entrance area is enlarged to some degree so as to help make entrance into the back seat easier, but the lower portion of the seat remains in the same position, thus restricting entrance at the point where the feet and legs must pass. Furthermore, the seat back cannot be folded forwardly to a satisfactory degree if a person is sitting in that particular front seat. Other types of previous seats and seat arrangements propose divided seats which may be tilted in their entirety in a forwardly direction so as to increase the effective area of entrance to the rear seat of a two-door type automobile. Such an arrangement allows free ingress and egress to the rear seat but has even to a greater degree the previously noted disadvantage of not functioning at all if a passenger is already seated in such tiltable seat. If no passenger is thus seated, lifting and tilting the seat still is laborious since the weight of the entire seat must be contended with. Since the body of a person entering the rear space of such an automobile is already in an awkward position it is difficult for him to apply the necessary strength to tilt the seat. Still other types of seats have been proposed in which the entire front seat may be pivoted in a forwardly direction from a point at one side or the other, the pivot point of one side becoming the outer radial point when pivoted about the opposite side. This arrangement has the disadvantage of requiring the entire front seat assembly to be moved forwardly, thus requiring considerable effort on the part of the back seat passenger, and more especially if the mechanism becomes corroded or dirty.

In all classes of the prior art devices it is very awkward for the driver of the automobile to assist the passenger in getting into the back seat while still remaining seated in the driver's position. Furthermore, I am aware of no instance in which either the driver or passenger can advance either of the independent portions of the front seat assembly so as to create a positive and complete opening for ingress to and egress from the back seat through the single door at the side of a two-door sedan. Likewise, there is no instance to my knowledge of prior art devices where individual front seats may be relatively advanced or retracted to facilitate access to the rear seat and where such seats may also be relatively advanced or retracted and maintained in adjusted position so as to suit the comfort of the driver and his front seat companion.

It is therefore a principal object of this invention to provide for an adjustable seat arrangement wherein movement of one of a pair of seats will cause the other to move in response thereto for adjusting the seats either for the comfort of the passenger and driver or to permit ingress and egress of a passenger.

It is another object of the invention to provide for means to adjust adjacent individual seats in an automobile in their entirety with respect to the automobile floor and for cooperating means to further adjust the seats relatively to one another.

It is a further object to provide for a unique and efficient seat assembly in which the driver or passenger, independently or together, may exert simple and natural physical force upon either or both of two seats so as to position the seats in a newly adjusted condition or to move either of them to a more forwardly position so as to permit an unobstructed entranceway through the single door at the side of a two-door vehicle to the front seat or to the rear seat.

It is a still further object of the invention to provide for a seat arrangement of the class described which will be extremely convenient and effective in operation and which will utilize to best advantage the limited space and facilities of an automobile in regard to consideration for passengers and for the storage and transportation of articles such as salesmen's merchandise where the driver is traveling alone.

These and other objects and advantages of my invention will more fully appear from the following description made in connection with the accompanying drawings wherein like reference characters refer to similar parts throughout the several views and in which:

Fig. 1 is a partial view of an automobile of the two-door type with the right hand door open and the right hand seat forwardly disposed;

Fig. 2 is a diagrammatic representation of the seat arrangement and mechanism for shifting the seats relative to one another with the right hand seat in a forward position;

Fig. 3 is a similar diagrammatic representation of the seat arrangement showing the seats in normal side by side position;

Fig. 4 is a detailed view with certain of the parts in section showing the cooperation of the latch means on the linkage mechanism for controlling differential shifting of the seats, and detent means for controlling simultaneous shifting of the seats;

Fig. 5 is a front view of the linkage mechanism with the seat arrangement in dotted line;

Fig. 6 is a side elevation similar to Fig. 4 with the latch means in retracted position; and Fig. 7 is a segmental top view of the linkage mechanism at the central bearing plate portion.

Referring now more particularly to the drawings, Fig. 1 represents an automobile C of the coach or two-door type having one large door 10 at the right side and a corresponding door 11 at the left side of the car. Disposed in a seat arrangement within the car are a right seat 12 and a left seat 13 in relatively adjustable positions as shown. Forming a part of the automobile floor 14 or disposed thereupon is a supporting structure indicated generally by the letter S. This structure may comprise metal channel elements 15 which act as guide rails for the seats 12 and 13 to ride upon in a forward and backward direction longitudinally of the entire automobile. Cooperating with the guide rails 15 are wheels or rollers 16 preferably disposed at each of the four corners of the right seat 12 and of the left seat 13. These wheels or rollers 16 may be mounted upon stub shafts 17 which in turn are affixed to depending bottom portions or legs 18 of the individual seats. The seats 12 and 13 are rigidly formed throughout and are styled and cushioned for comfort of the driver and passengers. Also mounted at the floor 14 of the automobile is linkage mechanism indicated generally at M. This linkage mechanism M may be secured directly to the floor 14 or may be attached to the supporting structure S. The mechanism comprises a floor plate 19 which is adapted to be secured with respect to the floor 14 of the automobile. Centrally of the floor plate 19 is a releasably fixed plate 20 which is adapted to slide longitudinally on ribs 21 of the floor plate 19 as shown in Fig. 4. Releasable plate 20 has an upstanding shaft or pivot pin 22 which is rigidly secured thereto. A rotatable bearing plate 23 is mounted for free rotation upon the pin or shaft 22 and may have grooved bearing braces 24 within which roller bearings 25 are disposed. A flange member 26 secured to the upstanding pin 22 maintains the rotatable plate 23 in engagement with the plate 20 and the bearing assembly disposed therebetween. Disposed centrally and longitudinally of the floor plate 19 are a series of openings 27 which are adapted to cooperate with lug 28 attached in turn to a bent leaf spring 29 comprising together a detent or latch for the releasably fixed plate 20. The detent or latch 29 may be secured to the underside of plate 20 by means such as bolt 30. Secured to the top of shaft or pin 22 as by bolt 31 is another leaf spring latch means 32. A depending peg 33 is secured as by screw 34 to the leaf spring 32 so as to cooperate with one of a series of holes 35 disposed arcuately in the rotatable bearing plate 23. Permanently disposed for receiving the end of peg 33 is a socket 36 in the releasably fixed plate 20. Openings 35 may have sloped sides as shown for easy entrance of the peg 33 therethrough. Both spring latches 29 and 32 are normally urged downwardly.

Extending laterally and oppositely of the rotatable bearing plate 23 are arms 37 and 38 each containing an elongated slot 39 at a position adjacent their ends. Secured to the underside from each of the seats 12 and 13 is a pin 40 which slidably engages the slots 39 in the arms 37 and 38. Spring 41 is attached at the underside of seat 12 at a point 43 and extends forwardly to a point 44 for attachment to the floor 14 of the car. Similarly the spring 42 is tensioned between point 45 at the rear of seat 13 and point 46 on the floor of the car. The springs 41 and 42 are always under tension, the stress being greater when the seat is rearwardly restricted and less when the seat is forwardly disposed.

*Operation*

In normal usage the seat arrangement is as shown in Fig. 3 with the right and left seat being in side by side aligned relation. While in this normal position the two seats may be adjusted as a unit without relative motion between them by the simple expedient of retracting the leaf spring 29 so as to disengage the lug 28 from the opening 27 in which it was previously secured, then urging the two seats in unison in a forward or backward direction with the releasably fixed plate 20 slidable upon the longitudinally disposed ribs 21 on the floor plate 19. When the proper disposition of the two seats has been acquired, the leaf spring 29 may again be released so as to secure the plate 20 with respect to the forward or backward adjustment desired. Ribs 21 may be T-shaped as shown so as to prevent the upward displacement of plate 20 from the floor. Manipulation of the leaf spring 29 is as shown in Fig. 4.

After the seats have been adjusted in unison, the further operation of my reciprocable mechanism is as follows: Where it is desired to create an ample space for ingress to the rear seat while the driver is sitting in the left front seat, he may raise the latch means 32 to the position shown in Fig. 6. At this point the depending peg 33 is lifted completely out of the socket 36 and the hole 35 in the rotatable bearing plate 23, thus freeing the rotatable plate for swingable movement of arms 37 and 38 about the upstanding pin 22. The driver then may lean backwards or gently push the floor board of the automobile with his feet and retract left seat 13, the rollers 16 riding upon the supporting structure S fixed to the floor 14 of the automobile. Simultaneously with the backward shifting movement of left seat 13, the arms 37 and 38 will be rotated in a counterclockwise direction as viewed in Fig. 2. The right seat 12 will thus move differentially in response to the movement of left seat 13 and will be advanced to the position shown in Fig. 1, thus creating ample space for a rear seat passenger to enter. If a passenger is seated in right seat 12, he may assist the driver by moving forwardly at the same time that the driver urges seat 13 rearwardly. Although it is not good practice from the standpoint of safety to have passengers enter an automobile from the left front door of a two-door type automobile, nevertheless the reverse reciprocation of the seats may be accomplished so as to permit easy ingress from the left side of the automobile to the rear seat thereof as well as the first mentioned operation. Since the backward pushing of the driver is an easier physical movement than the reverse operation, I prefer to provide spring means such as 41 and 42 previously set forth. These springs when used will always be under tension, the spring secured to a rearwardly moving seat being under greater tension than the one which is being moved forwardly. The net result is always to urge the seats back to a side by side relation as shown in Fig. 3. Where it is desired to maintain the seats out of alignment, as where a tall driver has a short passenger at his side, it may be desirable to leave the seats in an intermediately adjusted position. Thus, seat 12 may be advanced for several inches while the driver's seat will be retracted differentially for several inches. Latch means 32 will then be allowed to spring back under tension of the leaf spring mounted so as to cause the depending peg 33 to engage a new opening 35 and secure it over socket 36 so as to retain the arms in an intermediate position out of normal to the general longitudinal center line of the automobile body. A driver such as a traveling salesman who may be traveling alone and carrying a wardrobe, sample cases and so forth, may take advantage of the adjustable nature of the seats by advancing the right front seat to its greatest forward position, thus creating a relatively large floor area and easy access thereto for carrying large articles such as trunks and boxes.

It may thus be seen that I have devised a novel reciprocable seat arrangement which adds greatly to the comfort of driver and passengers while at the same time making much more flexible the use and purposes of a two-door type of automobile.

It will, of course, be understood that various changes may be made in the form, details, arrangement and proportions of the parts without departing from the scope of my invention.

What I claim is:

1. A seating arrangement for an automobile having a doorway at each side and a floor therebetween, said arrangement comprising a pair of seats, each mounted between said doors in side by side relation for guided reciprocation on said floor lengthwise in the longitudinal direction of the automobile, and linkage mechanism secured to the floor at a position intermediate said pair of seats, said linkage mechanism having interconnecting means pivotally mounted thereon, portions of which means extend rigidly and oppositely for respective engagement with the seats at a lower position thereon whereby movement of one of said pair of seats in a longitudinal direction will differentially cause a corresponding reciprocation of the other seat in the opposite direction.

2. A seating arrangement for an automobile having a doorway at each side and a floor therebetween, said arrangement comprising a pair of seats, each mounted between said doors in side by side relation for guided reciprocation on said floor lengthwise in the longitudinal direction of the automobile, and linkage mechanism secured for adjustment in the longitudinal direction of the automobile to said floor at a position intermediate said pair of seats, said linkage mechanism having rigidly and oppositely extending interconnecting means pivotally mounted thereon, said means respectively engaging each of said seats at a lower portion thereof whereby longitudinal adjustment of said linkage mechanism will cause both of said seats to move simultaneously therewith as a unit in the same direction, and adjustment of one of said pair of seats in a longitudinal direction with respect to said linkage mechanism will differentially cause a corresponding reciprocation of the other seat in the opposite direction.

3. A seating arrangement for an automobile having a doorway at each side and a floor therebetween, said arrangement comprising a pair of seats, each mounted between said doors in side by side relation for guided reciprocation on said floor lengthwise in the longitudinal direction of the automobile, and linkage mechanism mounted on said floor for longitudinal guided adjustment, latch means interposed between said linkage mechanism and the floor for securing at a longitudinal adjusted position, a rigid arm pivotally mounted intermediate the ends thereof on said linkage mechanism, engaging means at the ends of said arm for connecting said seats respectively to the arm, and additional latch means interposed between said rigid arm and the linkage mechanism whereby said linkage mechanism may be longitudinally adjusted and latched in position with the two seats moved as a unit in the same direction and, while in said adjusted position of the linkage mechanism, may be further reciprocated differentially with respect to said linkage mechanism, forward movement of one of said seats causing backward movement of the other seat, and being latchable in said differentially adjusted position.

4. An automobile seat assembly comprising a first seat mounted on the floor of an automobile and adjustably shiftable to a pre-selected guided position in the general longitudinal direction of said automobile, a second seat in side-by-side relation with said first seat and also mounted on the floor of the automobile and adjustably shiftable to a pre-selected guided position in the general longitudinal direction of the automobile, and a rigid linkage arm pivotally mounted with respect to the floor between said seats and having an abutting connection adjacent the opposite ends thereof with a lower portion of each respective seat, whereby upon moving one of said seats rearwardly with respect to the longitudinal disposition of the automobile, the other seat will be moved forwardly in a parallel relation with the first seat.

5. An automobile seat assembly comprising a plurality of guide tracks in spaced parallel relation on the floor of an automobile and running in the general direction of the automobile, a first seat mounted on a pair of said guide tracks and adjustably shiftable therealong to a pre-selected position, a second seat mounted in side-by-side relation with the first seat on an adjacent pair of guide tracks and also adjustably shiftable therealong, and a rigid arm having a pivotal mount adjustable along a line parallel to said guide tracks and disposed between said first and second seats, the rigid arm having side extensions at both sides of the pivot mount and interconnecting in abutting relation with the lower portion of each of said respective seats, and latch means interposed between said rigid arm and the automobile floor for securing both of said first and second seats at a pre-selected position with respect to said automobile floor and for securing each of said first and second seats at a pre-selected position with respect to the pivot mount, one of said seats when thrust rearwardly causing the other seat to be correspondingly thrust forwardly.

References Cited in the file of this patent

UNITED STATES PATENTS

| | | |
|---|---|---|
| 831,063 | Hale | Sept. 18, 1906 |
| 1,751,907 | Cripps | Mar. 25, 1930 |
| 2,563,220 | Doty | Aug. 7, 1951 |
| 2,587,679 | Atkinson | Mar. 4, 1952 |
| 2,618,312 | Bradley | Nov. 18, 1952 |

FOREIGN PATENTS

| | | |
|---|---|---|
| 354,376 | Germany | June 8, 1922 |
| 374,194 | Great Britain | June 9, 1932 |
| 571,433 | France | May 16, 1924 |